(Model.)
H. CULBERTSON.
OPTOMETER.
No. 349,385. Patented Sept. 21, 1886.
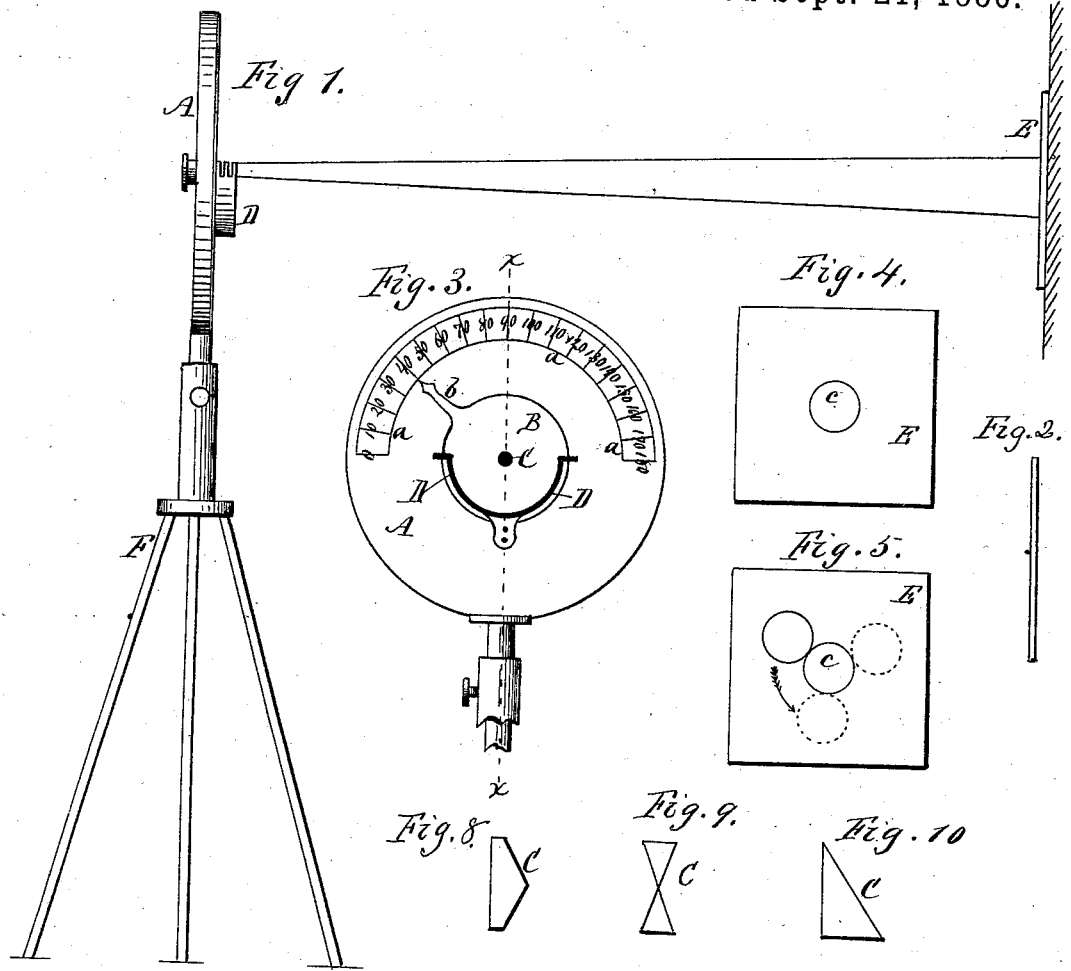
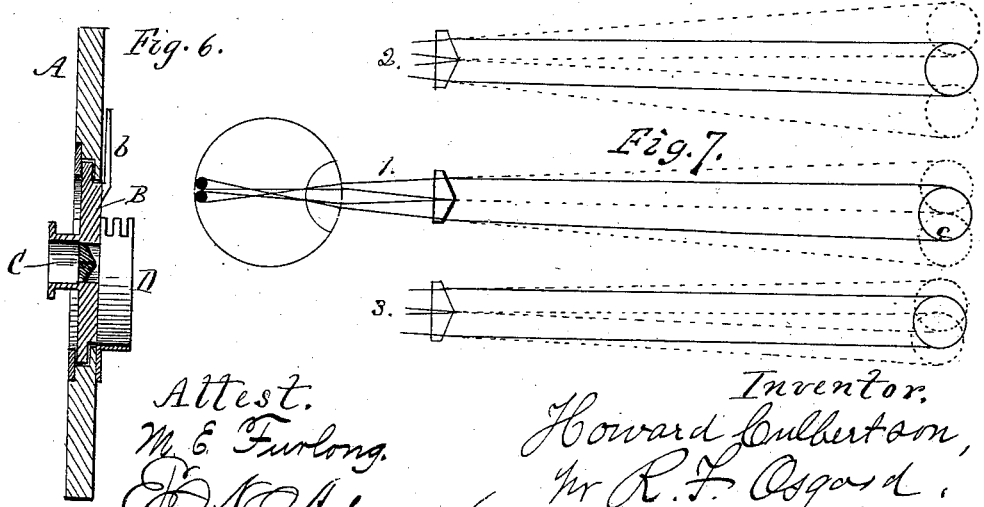
Attest.
M. E. Furlong.
E. N. Adam
Inventor.
Howard Culbertson,
per R. F. Osgood,
Atty.

United States Patent Office.

HOWARD CULBERTSON, OF ZANESVILLE, OHIO, ASSIGNOR TO THE GENEVA OPTICAL COMPANY, OF GENEVA, NEW YORK.

OPTOMETER.

SPECIFICATION forming part of Letters Patent No. 349,385, dated September 21, 1886.

Application filed July 9, 1885. Serial No. 171,048. (Model.)

*To all whom it may concern:*

Be it known that I, HOWARD CULBERTSON, of Zanesville, in the county of Muskingum and State of Ohio, have invented a certain new and useful Improvement in Prisoptometers; and I do hereby declare that the following is a full, clear, and exact description of the same, reference being had to the accompanying drawings, in which—

Figure 1 is a side elevation of the instrument. Fig. 2 is an edge view of the screen. Fig. 3 is a front elevation of Fig. 1 and at right angles to same. Fig. 4 is a face view of the screen, showing the natural form of the image thereon. Fig. 5 is a similar view showing the apparent double images. Fig. 6 is a cross-section of Fig. 3 in line $x\ x$ and enlarged. Fig. 7 is a series of diagrams illustrating the refractive action of the prism in looking through the instrument. Figs. 8, 9, and 10 are views of different forms of prisms.

This invention relates to instruments for measuring the abnormal defects of the eye for the purpose of fitting glasses accurately thereto, and also for oculists' uses; and it consists in an instrument composed of a suitable frame or head-piece, at or near the center of which is fitted a rotating prism holder or carrier, in which holder is fitted a single or double faced prism or a pair of prisms so arranged that the eye of a person looking through the instrument shall receive rays of light through both prisms or prism-faces, where two prisms are used or a double-faced single prism, or through the prism and the adjacent space or plane glass, where a single one-faced prism is used, and by this means the eye shall receive upon the retina two images of an object, and thereby the condition of the eye as to its refractive power, whether normal, myopic, or hypermetropic, shall be ascertained by the relative positions of the said images, as hereinafter set forth; and in connection with the above-named rotating prism or prisms a suitable circle degree-scale, to determine the meridian or angular position of the myopic or hypermetropic portion or portions of the eye when abnormal; also, a lens-holder for applying an adjusting-lens on the instrument, and an object-circle on a suitable screen, for use in forming the test images with the eye, all as hereinafter specified.

A shows a disk or head, preferably of circular form, supported by a tripod, bracket, or other supporting device, F, in such a manner, if desired, that it can be raised or lowered. This disk or head is marked off on one side with a scale of degrees occupying a half-circle or more, as shown at $a$, Fig. 3.

B is a circular holder, of metal or other suitable material, set accurately into the frame A, and capable of rotation therein a part or a whole of a circle. It is provided with a handle, $b$, by which it is turned, the handle also serving as a pointer moving over the scale of degrees before described.

C is a small prism set centrally in the holder and turning with it. The prism has two faces with the bases meeting, as shown in Fig. 8, or the apices meeting, as shown in Fig. 9, or a single-faced prism may be used, as in Fig. 10, the angle at the acute edge being sufficiently increased to show a complete image distinct from the image seen outside of the prism. Preferably, however, the form shown in Fig. 9 is used. It may be made of one solid piece of glass, or of two pieces placed in juxtaposition, as the same result will be produced in either case.

D is a half-circular holder attached to the frame A in position to receive trial lenses in front of the prism.

E is a separate screen, on which is painted or otherwise made a circular or equivalent form of image, $c$, which is distinct in color from the background of the screen, and has a clearly-defined outline.

When properly constructed, the angle of the prism or prisms is such and the diameter of the object-circle $c$ and its distance from the prism are so calculated that there are formed upon the retina of the normal eye two images of the object-circle tangent to each other, or touching at their adjacent edges. With the prism or prisms arranged with the apices toward each other, as shown in Fig. 9, to the myopic eye the two images will appear to overlap to a greater or less extent, according to the degree of myopia characteristic of the eye, and to the hypermetropic eye the images will appear separated from each other more or less, according to the degree of hypermetropia possessed by the eye. On the other hand, with the prism or prisms arranged with the bases toward each other, as shown in Fig. 8, to the myopic eye the images appear to be separated, and to the hypermetropic eye the images appear to overlap. I have shown in Fig. 7 diagrams as follows: No. 1 illustrates the action of the prisms, as in Fig. 8, to the normal eye, the dotted lines showing the images tangent to each other. No. 2 shows the images separated, as in a certain degree of myopia, and No. 3 shows the images overlapped, as in a certain degree of hypermetropia.

The single-faced lens, Fig. 10, may be used with its apex in the center line of sight acting as the double prism in Fig. 9, or with its base in the center line of sight acting as the double-faced prism in Fig. 8.

The instrument is used by the person placing his eye to the tube behind the prism in a central or proper position and looking through the prism at the object-circle, which is adjusted to the proper distance away from the lens and directly before it. The images of the object-circle will at once indicate the degree of myopia or hypermetropia, if any, belonging to the eye tested. By rotating the prism one image will travel around the other, and the eye can be tested in each meridian, and the presence and degree of astigmatism can be ascertained. Having ascertained that the eye has a curvature that is abnormal, a convex or concave lens is placed in the holder D, that will make the double images on the screen touch in all the points of circuit, thus ascertaining the degree of ammetropia and the lens necessary for its correction.

Having described my invention, what I claim as new, and desire to secure by Letters Patent, is—

1. The combination of a prism-holder, a prism or prisms arranged in the holder with a terminal edge of the prismatic face or faces in the central line of sight through the said prism or prisms, and an object-circle arranged concentrically in the line of sight, substantially as herein specified, and for the purpose set forth.

2. The combination of a sustaining disk or frame, a prism-holder adapted to be rotated on its axis in the said disk or frame, a prism or prisms arranged in the holder with a terminal edge of the prismatic face or faces in the central line of sight through the said prism or prisms coincident with the axis of the holder, and an object-circle arranged concentrically in the central line of sight and with the axis of the holder, substantially as and for the purpose herein set forth.

3. The combination of a supporting disk or frame provided with the degree-marks upon its face, a prism-holder adapted to be rotated on its axis in the said disk or frame, a prism or prisms arranged in the holder with a terminal edge of the prismatic face or faces in the central line of sight through the said prism or prisms coincident with the axis of the holder, and an object-circle arranged concentrically in the central line of sight and with the axis of the holder, substantially as and for the purpose herein set forth.

4. The combination of a supporting frame or disk, a prism-holder adapted to be rotated on its axis in the said disk or frame, a prism or prisms arranged in the holder with a terminal edge of the prismatic face or faces in the central line of sight through the said prism or prisms coincident with the axis of the holder, and a lens-holder attached to the disk or frame in front of the prism or prisms, and with its axis coincident with the axis of the prism-holder, substantially as and for the purpose herein set forth.

In witness whereof I have hereunto signed my name in the presence of two subscribing witnesses.

HOWARD CULBERTSON.

Witnesses:
 M. L. MILLIGAN,
 FRANK DURBAN.